United States Patent
Komissarchik et al.

(10) Patent No.: US 9,076,347 B2
(45) Date of Patent: Jul. 7, 2015

(54) SYSTEM AND METHODS FOR IMPROVING LANGUAGE PRONUNCIATION

(71) Applicants: Julia Komissarchik, Hillsborough, CA (US); Edward Komissarchik, Hillsborough, CA (US)

(72) Inventors: Julia Komissarchik, Hillsborough, CA (US); Edward Komissarchik, Hillsborough, CA (US)

(73) Assignee: Better Accent, LLC, San Mateo, CA (US)

(*) Notice: Subject to any disclaimer, the term of this patent is extended or adjusted under 35 U.S.C. 154(b) by 204 days.

(21) Appl. No.: 13/828,843

(22) Filed: Mar. 14, 2013

(65) Prior Publication Data

US 2014/0278421 A1 Sep. 18, 2014

(51) Int. Cl.
G10L 15/04 (2013.01)
G09B 19/06 (2006.01)
G10L 15/26 (2006.01)
G10L 25/48 (2013.01)

(52) U.S. Cl.
CPC .............. *G09B 19/06* (2013.01); *G10L 15/26* (2013.01); *G10L 25/48* (2013.01)

(58) Field of Classification Search
CPC ........ G09B 19/06; G10L 15/26; G10L 25/28; G10L 15/19; G10L 15/187; G10L 15/265
USPC ................. 704/254, 251, 260, 270, 2, 8, 257; 434/167, 156, 157, 185, 169; 381/98; 715/264
See application file for complete search history.

(56) References Cited

U.S. PATENT DOCUMENTS

| | | | | |
|---|---|---|---|---|
| 4,969,194 A | * | 11/1990 | Ezawa et al. | 704/276 |
| 5,393,236 A | * | 2/1995 | Blackmer et al. | 434/169 |
| 5,634,086 A | * | 5/1997 | Rtischev et al. | 704/270 |
| 5,748,840 A | * | 5/1998 | La Rue | 704/254 |
| 5,799,276 A | * | 8/1998 | Komissarchik et al. | 704/251 |
| 5,810,599 A | * | 9/1998 | Bishop | 434/157 |
| 6,224,383 B1 | * | 5/2001 | Shannon | 434/156 |
| 6,272,464 B1 | * | 8/2001 | Kiraz et al. | 704/257 |
| 6,347,300 B1 | * | 2/2002 | Minematsu | 704/270 |
| 6,397,185 B1 | * | 5/2002 | Komissarchik et al. | 704/270 |
| 6,711,543 B2 | * | 3/2004 | Cameron | 704/270 |
| 7,614,880 B2 | * | 11/2009 | Bennett | 434/167 |
| 7,752,045 B2 | | 7/2010 | Eskenazi | |
| 2003/0033152 A1 | * | 2/2003 | Cameron | 704/275 |
| 2004/0067471 A1 | * | 4/2004 | Bennett | 434/167 |
| 2007/0015121 A1 | * | 1/2007 | Johnson et al. | 434/156 |
| 2007/0055523 A1 | * | 3/2007 | Yang | 704/257 |
| 2008/0153074 A1 | * | 6/2008 | Miziniak | 434/178 |
| 2009/0083288 A1 | * | 3/2009 | LeDain et al. | 707/10 |
| 2009/0305203 A1 | | 12/2009 | Okumura et al. | |
| 2010/0304342 A1 | * | 12/2010 | Zilber | 434/157 |
| 2011/0218806 A1 | * | 9/2011 | Alewine et al. | 704/251 |
| 2011/0282650 A1 | * | 11/2011 | Jennings et al. | 704/8 |
| 2011/0307241 A1 | * | 12/2011 | Waibel et al. | 704/2 |

* cited by examiner

*Primary Examiner* — Vijay B Chawan
(74) *Attorney, Agent, or Firm* — Foley & Lardner LLP; Nicola A. Pisano

(57) ABSTRACT

A system and methods for analyzing pronunciation, detecting errors and providing automatic feedback to help non-native speakers improve pronunciation of a foreign language is provided that employs publicly available, high accuracy third-party automatic speech recognizers available via the Internet to analyze and identify mispronunciations.

20 Claims, 8 Drawing Sheets

SYSTEM AND METHODS FOR IMPROVING LANGUAGE PRONUNCIATION

FIELD OF THE INVENTION

The present invention relates generally to the field of language training and particularly to a system and methods for improving pronunciation when speaking a non-native language.

BACKGROUND OF THE INVENTION

Learning to correctly pronounce a non-native language is a challenging problem. The classic solution to this problem is to have a teacher who is a native speaker of the foreign language, who provides detailed feedback regarding mispronunciation errors and how to correct such errors. While detection of mispronunciation is a relatively easy task for a native speaker, experience shows that this can be quite difficult for a non-native speaker. The reason is very simple—if a particular sound does not exist in a speaker's native language, the speaker will have difficulty distinguishing between correct and incorrect pronunciation. Even more difficult is the task of knowing what to change in the way one pronounces (or rather mispronounces) a sound to make it right, and it is here that a teacher's feedback is critical.

With the creation of automatic speech recognition ("ASR") systems the task of having feedback provided by a machine rather than from a human teacher became somewhat attainable. The challenge of creating such a machine is that the main focus of the ASR systems was and is on recognizing what is said rather than detecting what is incorrectly pronounced. Thus, instead of emphasizing pronunciation errors, previously-known ASR systems attempt to decipher what was said, even if an utterance was pronounced incorrectly. One method to overcome the inability of previously-known ASR systems to handle mispronunciation involves trying to isolate poorly pronounced sounds in the utterance using a Viterbi algorithm for wave segmentation based on recognition scores. This approach was used by Maxine Eskenazi in her work in early 2000's and is described in her U.S. Pat. No. 7,752,045. That patent compares acoustic features of a mispronounced sound with the acoustic features from a pre-recorded database of native speakers' utterances. A similar approach is proposed in U.S. Patent Application Publication No. 2009/0305203 A1, which describes detailed acoustic analysis of segments for individual phonemes to determine if they were mispronounced.

One drawback of the methodology employed in the foregoing patent and application is that they rely on the segmentation of the utterance based on the best score recognition, which is not reliable—especially for a non-native speaker. Due to the nature of the Viterbi algorithm, it cannot recover from errors in segmentation in cases of serious mispronunciation and instead produces as a result an incorrect phoneme alignment. These errors in turn produce unreliable feedback to the speaker, even if the acoustic features are perfectly extracted and classified, which by itself is a very challenging task.

In view of the shortcomings of the prior art, it would be desirable to develop a new approach to detecting pronunciation errors that is less prone to segmentation errors resulting from mispronounced utterances.

It further would be desirable to provide a system and methods for improving pronunciation of a non-native language that takes advantage of publicly accessible, robust third party ASR systems, especially the Google Voice system developed by Google, Inc.

It still further would be desirable to provide a system and methods for learning to speak a non-native language that does not require studying how to pronounce each word and practicing to pronounce each word in the dictionary, but rather enables the student to acquire knowledge and skills to pronounce properly phonemes and sequences of phones like triphones in real time.

It also would be desirable to provide a system and methods for improving pronunciation of a non-native language that monitors the response of publicly accessible third party ASR systems to mispronunciations of a representative set of words (e.g., that covers all phonemes and triphones) and provides automatic feedback to assist users to correct mispronunciation errors.

It further would be desirable to provide a system and methods for improving pronunciation of a non-native language that enables a user to invoke and use the system in real-time situations using previously-known mobile devices, such as cell phones.

SUMMARY OF THE INVENTION

In view of the aforementioned drawbacks of previously-known systems and methods, the present invention provides a system and methods for analyzing pronunciation and providing feedback on pronunciation errors to improve accuracy and to reduce accent when learning to speak a non-native language.

The present invention further provides a computer-assisted system comprising a plurality of software modules that encode methods for detecting and instructing a user how to correct pronunciation errors that is less prone to segmentation errors resulting from mispronounced utterances. In accordance with one aspect of the invention, the inventive system and methods take advantage of publicly accessible, robust third party ASR systems, such as the Google Voice system developed by Google, Inc. Rather that requiring that the student study how to pronounce each word and practice pronouncing words in a dictionary, the inventive system and methods enable the student to acquire knowledge and skills to pronounce properly phonemes and sequences of phones like triphones in real time. Instead of requiring study of the non-native language in a classroom environment, the system and methods of the present invention enable a student to invoke and use the system in real-time situations using mobile communications devices, such as cell phones and wireless hotspots.

In accordance with one aspect to the invention, a system and methods for improving pronunciation of a non-native language are provided wherein the response of a publicly accessible third party ASR system to input of an utterance is monitored to detect mispronunciations of a representative set of words. Such representative word sets preferably include all phonemes and triphones needed to correctly pronounce a predetermined percentage of the words in the non-native language. When the ASR response is detected to correspond to a common mispronunciation, the inventive system and methods provides automatic feedback to assist the user to correct the mispronunciation errors.

In accordance with another aspect of the invention, user utterances may be saved in a repository for later playback and comparison, and performance metrics associated with a user's progress in learning correct pronunciation of the non-native language may be generated and stored for later review.

BRIEF DESCRIPTION OF THE DRAWINGS

Further features of the invention, its nature and various advantages will be apparent from the accompanying drawings and the following detailed description of the preferred embodiments, in which:

FIGS. 1a and 1b are, respectively, a schematic diagram of the system of the present invention comprising software modules programmed to operate on a computer system of conventional design having Internet access, and representative components of exemplary hardware for implementing the system of FIG. 1a.

DETAILED DESCRIPTION OF THE PREFERRED EMBODIMENTS

Figure 1A:
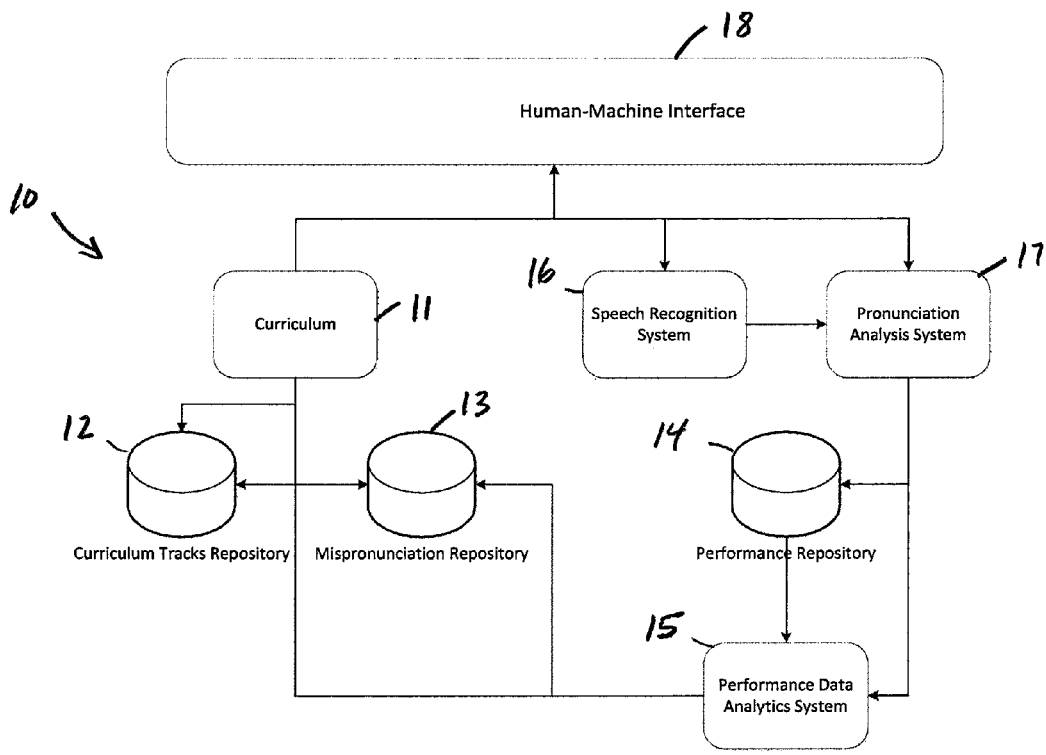

Referring to FIG. 1a, system 10 for improving pronunciation during learning of a non-native language is described. System 10 comprises a number of software modules that cooperate to detect mispronunciations in a user's utterances, and preferably provide detailed feedback to the user that enables him or her to better speak the language. In particular, system 10 comprise curriculum 11, curriculum tracks repository 12, mispronunciation repository 13, performance repository 14, performance analytics system 15, automatic speech recognition system ("ASR") 16, pronunciation analysis and feedback system 17 and human-machine interface component 18.

Figure 1B:
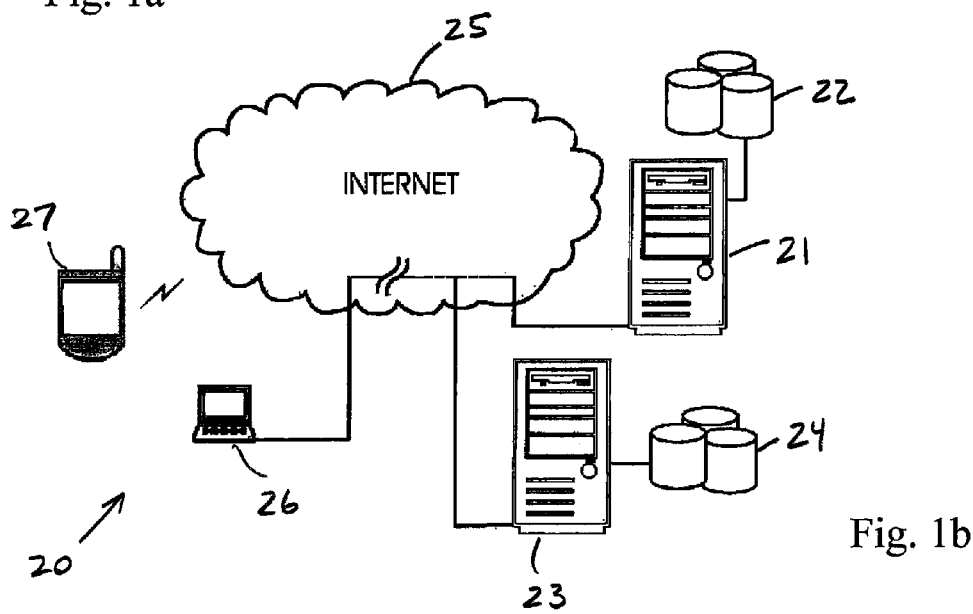

Components 11-18 may be implemented as a standalone system capable of running on a single personal computer. More preferably, however, components 11-18 are distributed over a network, so that certain components, such as repositories 12, 13 and 14 and ASR 16 are based on servers accessible via the Internet. FIG. 1b provides one such exemplary embodiment of system 20, wherein repositories 12, 13 and 14 may be hosted by the provider of the pronunciation improvement software on server 21 including storage system 22, while ASR system 16, such as the Google Voice system, is hosted on server 23 including database 24. Servers 21 and 23 are coupled to Internet 25 via known communication pathways, including wired and wireless networks.

A student using the inventive system and methods of the present invention may access Internet 25 via personal computer 26, illustratively using a wired connection, or via mobile device 27 using a wireless telephone or 802.11 compatible hotspot. Human-machine interface component 18 preferably is loaded onto and runs on computer 26 or mobile device 27, while curriculum 11, performance data analytics system 15 and pronunciation analysis system 17 may operate either on the client side (i.e., computer 26 or mobile device 27) or server side (i.e., server 21), depending upon the complexity and processing capability required for specific embodiments of the inventive system.

Each of the foregoing subsystems and components 11-18 are described below.

Curriculum

Figure 2A:
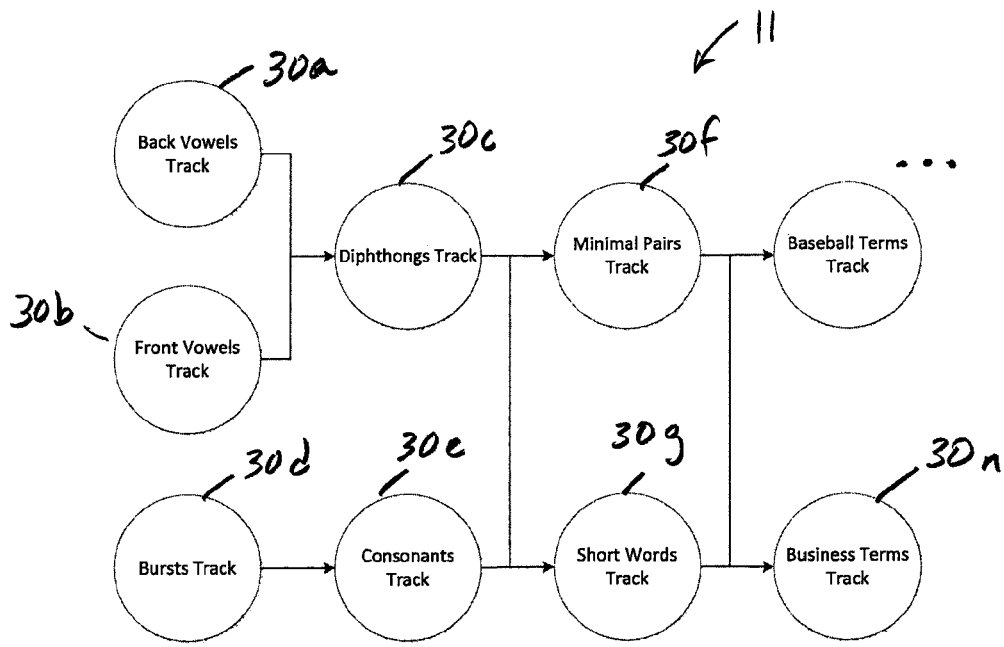
FIGS. 2a, 2b and 2c are schematic diagrams of aspects of an exemplary curriculum suitable for use in the systems and methods of the present invention.

Referring now to FIG. 2a, exemplary curriculum 11 comprises series of tracks 30a . . . 30n. Preferably, each track 30a . . . 30n is a direct acyclic graph. Each node 30a . . . 30n is uniquely defined by the phrase it contains, such that each outgoing edge shows the next node to be presented to a user. Typically there are two outgoing edges—a first path to continue along the current track and a second path to go to additional practice due to persistent errors in basic pronunciation skills. For any track 30a . . . 30n at any given moment, there is a node the user is on, the "current node." The decision regarding which node is to be presented as the next node depends on the performance of the user on the current node and also can take into account the performance of the user on previous nodes in the track or even in other tracks.

Tracks 30a . . . 30n are organized in a direct acyclic graph—a so-called "prerequisite graph." Some tracks presume that a user already has mastered more basic tracks. For example before working on business terms track 30n, curriculum 11 may be organized to require a user to be proficient in properly pronouncing words in short words track 30g. A track may have an arbitrary number of prerequisite tracks.

Figure 2B:
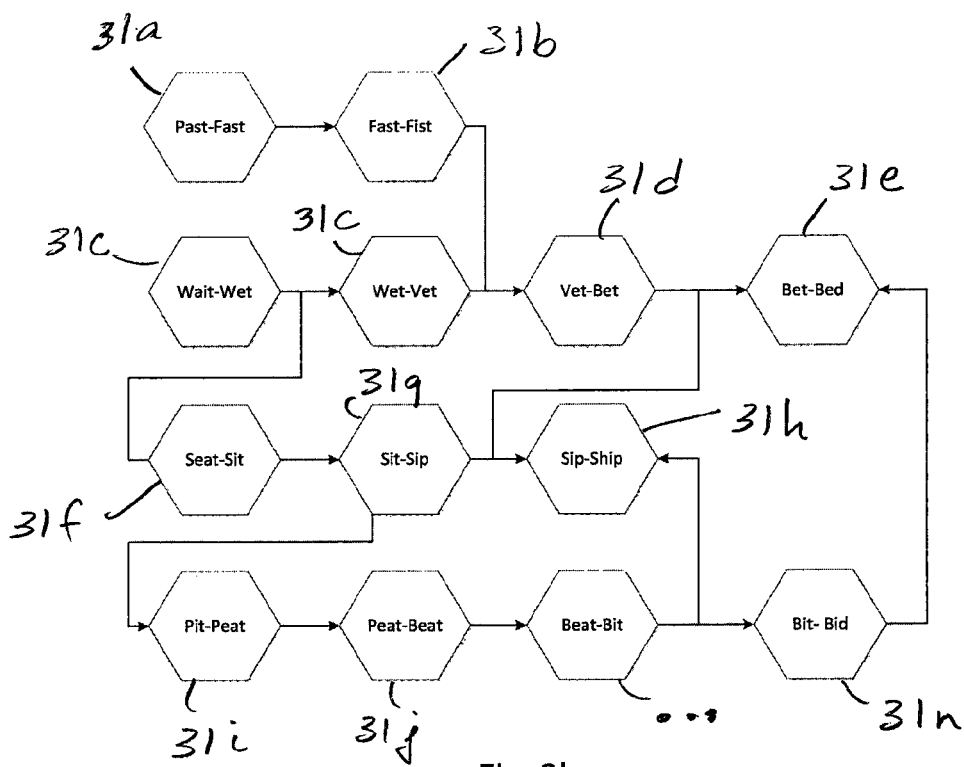

A user's progress through the various tracks 30a . . . 30n is monitored by and may be stored in performance repository 14. This enables a user to retrace the sequence of nodes in each track the user has completed. FIG. 2b provides an example of words within a track, such as minimal pairs track 30f. For example, the user may be prompted to say each word in pairs 31a . . . 31n, which is processed as described below and then appropriate feedback presented to the user using the star format illustrated in FIG. 2c, and described in further detail below. Each node 31a . . . 31n in a track is associated with a minimum and maximum numbers of attempts the user can have in pronouncing the corresponding words or phrases in that node.

A node 31a . . . 31n may belong to multiple tracks 30a . . . 30n. In addition, tracks may be organized around a theme, e.g., nodes may be arranged in groups, such as "individual sounds group", "minimal pairs group", "business meeting group", etc.

Curriculum 11 may be updated and enhanced at any time. For example, as a user becomes more proficient in pronouncing the non-native language, the tracks (or some of the nodes within the tracks) may increase in complexity and/or difficulty. In addition, some nodes and tracks may be generated manually and/or automatically derived from topic descriptions or articles about topics selected by the user. Automatic synchronization between server 21 and computer 26 or mobile device 27 permits seamless update to the system that permit the system capabilities to expand as user proficiency grows.

Curriculum tracks repository 12 preferably stores information for each node, themes, tracks, and tracks prerequisites. Alternatively, a user may store all or any part of the curriculum on his or her computer 26 or mobile device 27.

Mispronunciation Repository

Figure 2C:
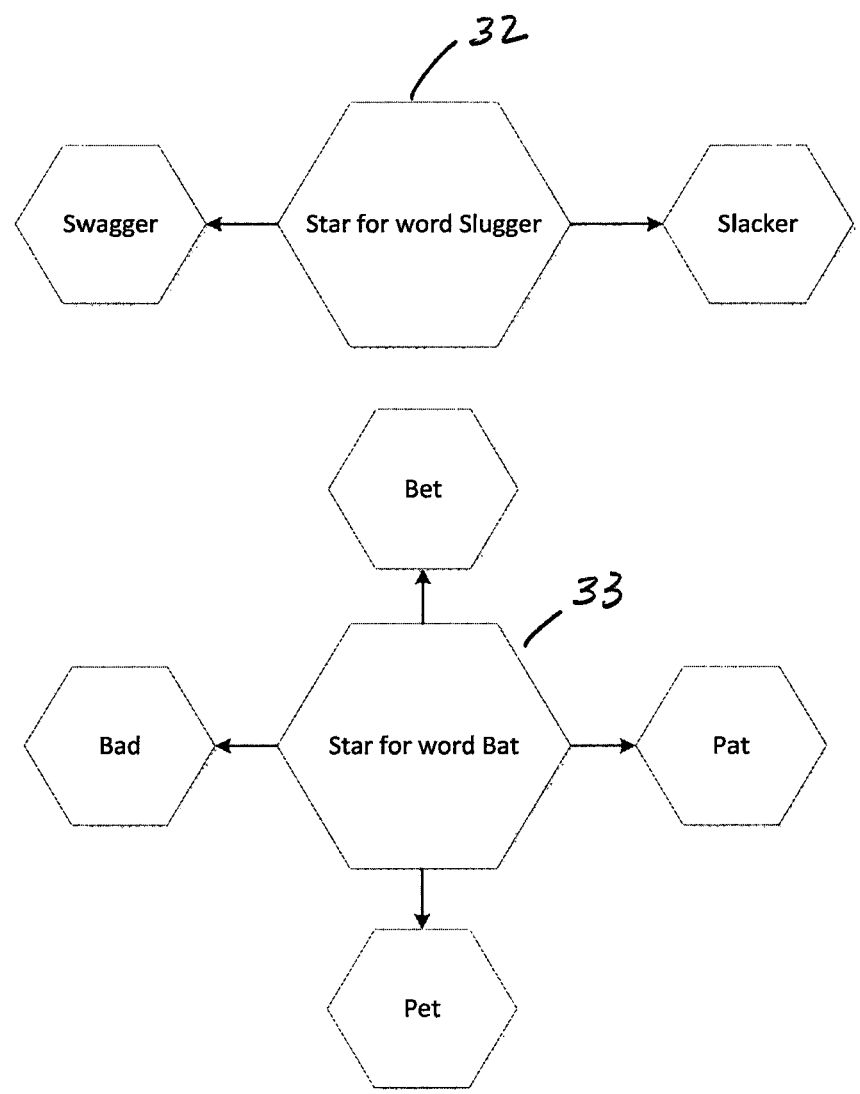
Figure 3:
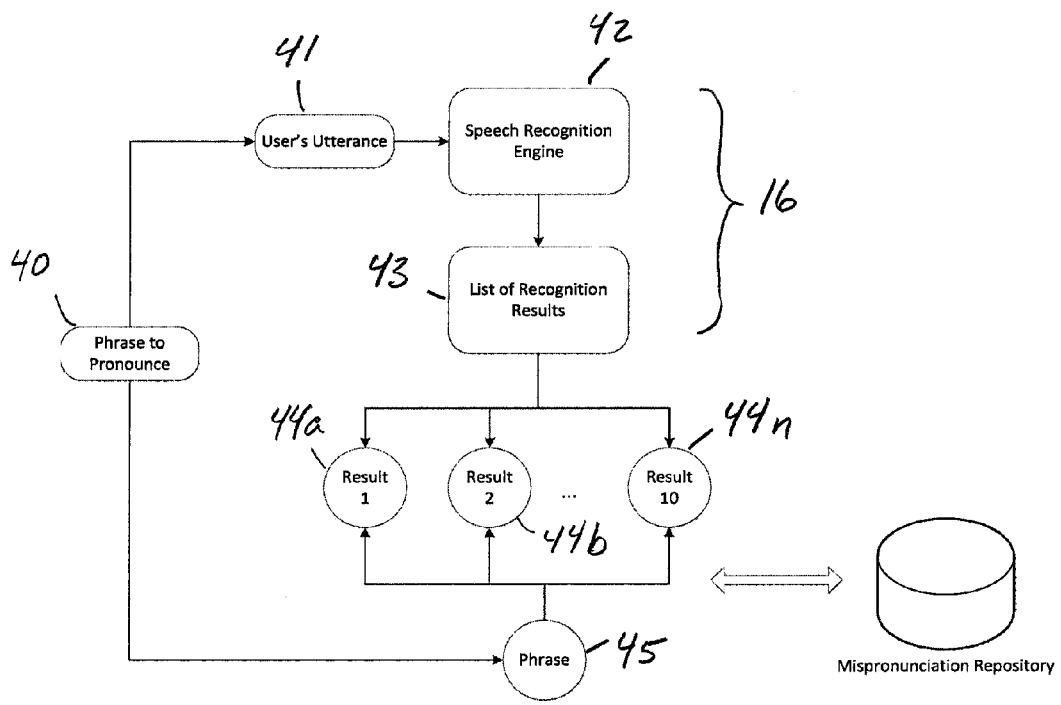
FIG. 3 is a schematic diagram depicting an exemplary embodiment of a pronunciation analysis system in accordance with the present invention.

Referring now to FIG. 3, when a user pronounces phrase 40 from a particular node, resulting utterance 41 is supplied to automatic speech recognition engine 42 of ASR 16 returns list of recognition results 43, illustratively, result 1 through result 10, labeled 44a . . . 44n. Typically list 43 is ordered by a confidence score. Each ASR has its own peculiarities and potentially different dictionaries, so the results may be different for different ASR's. For each ASR 16 and each node (31a . . . 31n for a selected track 30a . . . 30n), a node star is generated. Exemplary node stars 32 and 33 are depicted in FIG. 2c. The center of the node star is a node from a curriculum track, and each ray of the node star represents a particular mispronunciation. The end of each ray is a phrase recognized instead of the correct phrase at the center of the node star. Thus, for example, node star 32 corresponds to the word "slugger" and includes as potential mispronunciations the words "swagger" and "slacker", whereas node star 33 corresponds to the word "bat" and includes rays for the mispronunciations "bad", "bet", "pat" and "pet." As discussed below, pronunciation analysis system 17 (see FIG. 1a) preferably includes detailed feedback and directions the guide the user in correcting subsequent attempts to pronounce the word at the center of the node star.

The number and content of the rays emanating from the node star is defined by a number of factors, including the native language of a user, gender, lisp, ASR confusions, reliability of recognition, ability to devise the reason for mispronunciation, etc. Each of these factors may be described as follows:

Native language. Native speakers of one language often will have similar mispronunciation errors when attempting to pronounce a specific second language. For example, native Japanese speakers tend to confuse English '1' and 'r' sounds, which are virtually indistinguishable in Japanese. This mispronunciation error can cause considerable confusion to native English speakers.

Gender. Due to higher pitch and additional aspiration, female voice often is more difficult to recognize and accordingly the ASR error rate for women typically is higher. Also, the types of misrecognition occurring for female voices may be different than those observed for male voices. Thus, for different native languages, gender differences may lead to larger or smaller misrecognition errors. For example, Japanese males frequently have flat pitch, which is a contributing factor to the quality of recognition for such speakers, and consequently affects the list of returned ASR results. Due to the fact that pitch for children's voices is high, recognition accuracy can be quite low.

Lisp. Different speech impediments create pronunciation errors that are not specific to the selected native language or gender. Given the current state of ASR technology, it is quite difficult to determine what kind of lisp is present or to provide directions for correcting lisp-related errors only.

ASR confusions. Depending upon the complexity of the ASR and the number of samples used to create the ASR database, an ASR can become confused about what was said due to proximity of allowed pronunciations of two different words, e.g. 'best' and 'vest'. In some cases, the fact that the correct word is ranked lower that a similar but incorrect word in the list of ASR results 43 does not mean that the pronunciation was incorrect—only that the ASR does an imperfect job of discriminating between similar sounding words. For example, if the phrase in a node is 'vest' and ASR does not return 'vest' or 'best' then it can be inferred with high likelihood that there was a pronunciation error. However, if list of recognition results 45 ranks "best" as the first result choice and "vest" as the second result choice, than the pronunciation is deemed acceptable.

ASR results reliability. Depending on the acoustic and language model, and the dictionary used by the ASR, peculiarities may arise in the list of recognition results that are not based on pronunciation errors. For example, words 'picture' and 'pitcher' can be easily confused by a native speaker as well as by an ASR. If the phrase in a node consists of just one word, so that no context is available to the ASR, a higher recognition score in most cases will be given to the more frequently used word "picture." Thus, even if the word "pitcher" is not even present in the list of ASR results, but the word "picture" is on the top of the list or close by, it may be considered acceptable to user pass on to the next node of the track. Accordingly, in such situations it may be preferable expand adjacent nodes to include further context. For example, in addition to a node with the phrase "pitcher," it may be desirable to include another node with the phrase "baseball pitcher" to see whether the phrase "baseball pitcher" is ranked higher in the ASR score than the phrase "baseball picture."

Ability to devise a reason for mispronunciation. In some cases even if it is known that the recognition result is incorrect, there does not exist a good way to figure out the cause of the mispronunciation. Fr example, if a particular word is grossly mispronounced or a phrase is partially mispronounced, there may yet be remnants of the properly pronounced words in the utterance. In such cases, it is hard to say if the utterance was simply a bad attempt or just background noise with no attempt by the user to pronounce a given phrase. In addition, mispronunciation may be just one of a number of contributing factors, such as, for example, wrong word sequence, incorrect grammar, omission, hesitation, etc. If the cause of mispronunciation in a given utterance is unclear, that particular attempt may be discarded, i.e., not included in the mispronunciation repository and the user may be asked to try speaking the utterance again.

Automatic Speech Recognizer

In accordance with one aspect of the present invention, the speech pronunciation improvement system may use any good speech recognition system, either proprietary or more preferably, publicly accessible via the Internet. At the moment due to a number of factors including quality, speed and the fact that it is free for an unlimited number of users, the Android Speech Recognizer system or Google Voice may be a good choice.

Currently, the Google Voice system has two modes of operation: web_search and free_form. The web_search mode was built from a collection of 230 billion words input via Google search queries; the free-form mode of operation is believed to include additional voice samples collected during the existence of Google, Inc.'s Goog-411 free directory assistance project. In a preferred embodiment, human-machine interface 18 may be coded to accept a speech sample from the microphone of computer 26 or mobile device 27, invoke the Google ASR via the Internet, and process the results returned from the Google ASR as further described below.

Pronunciation Analysis and Feedback Algorithm

Referring again to FIG. 3, the structure and operation of pronunciation analysis system 17 is described. As discussed above, when a user pronounces a phrase from a node, the utterance is supplied to ASR engine 42 and recognition results 44a . . . 44n are analyzed to determine whether pronunciation errors occurred, if any. In the illustrative embodiment of FIG. 3, ASR engine 42 provides up to 10 results ordered by a confidence score. In some cases not only the order of results but the confidence scores for each of the results may be provided.

The following algorithm takes the ASR results for the utterance spoken for phrase 45 of a node and using the corresponding node star (see FIG. 2c) returns a score and provides feedback on what was mispronounced, if anything. In accordance with one aspect of the invention, the algorithm attempts to find the ray emanating from the node star that best matches the ASR results. Then, the explanation associated with the chosen ray is selected and displayed as feedback to the user. As described with respect to the screenshots of FIG. 5 in connection with human-machine interface 18, such explanations may include detailed directions on position of lips, tongue, relative position of tongue versus teeth, presence or absence of vibration of the vocal cords, etc. to make the correct sound associated with the center phrase of the node star.

It is contemplated that the foregoing system will provide a great utility in improving a non-native speaker's pronunciation of a foreign language. However, there may be cases when the best match is not necessarily the correct one. Reasons that this might occur include: (1) the language model of ASR engine 42 may be such that the correct answer is not in the ASR dictionary; (2) the ASR may misrecognize a correctly pronounced phrase and mistake it for a different one; and, (3) the node star might not include information about correctly recognized but incorrectly pronounced phrases. Although not much can be done for the first two sources of error, the third is addressed in discussion of performance data analytics system 15, below.

Feedback Algorithm

1. When ASR confidence scores are available in connection with results 44a . . . 44n, preferably only those results having a confidence level exceeding a predetermined threshold (e.g., 0.75 confidence level) are analyzed to provide feedback to the user; otherwise, none of the results are deemed valid and the user may be asked to try pronunciation of the node phrase again.

2. If the highest ranked result 44a . . . 44n matches center phrase 45, the pronunciation is deemed acceptable and a notation is stored in performance repository that the corresponding element of that track has been successfully completed.

3. If none of the top N results (e.g., N=4) match center phrase 45 or the ray phrases for that center phrase, the pronunciation is deemed unacceptable and a notation is stored in performance repository that the corresponding element of that track must be repeated until it has been successfully completed.

4. If center phrase 45 is ranked lower than a ray phrase by N (e.g., N=4) in list of recognition results 43, the user feedback corresponding to the highest ranked ray phrase is selected and displayed to the user.

5. Additional conditions may be used or imposed. For example, for cases where the ASR consistently misrecognizes a phrase as a specific other phrase, the utterance may be deemed acceptable without display of any comments. In this case, the mispronunciation repository may be updated as described below.

Performance Repository

Performance repository 14 (see FIG. 1a) stores records of all attempts by the user to pronounce a phrase corresponding to each node in a track. The information stored may include the description of the pronunciation attempt, and optionally the sound wave of the uttered phrase and ASR results. Performance repository 14 may reside on the user's computer 26 or mobile device 27, or alternatively may reside on storage 22 associated with server 21. The version of the repository on the user's computer or mobile device may contain detailed information of all exercises of a particular user and the information about cumulative results of other users. The version of repository 14 on server 21 may contain detailed information about all exercises of all users.

Performance Data Analytics

Figure 4:
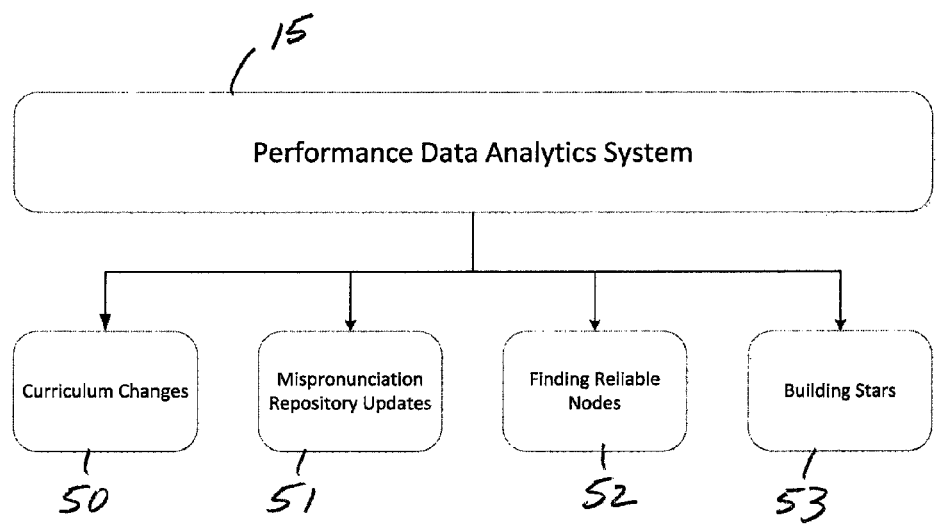
FIG. 4 is a schematic diagram depicting an exemplary embodiment of a performance analytics system in accordance with the present invention.

Referring now to FIG. 4, performance data analytics system 15 is described. As noted above, the results of each exercise of each user may be stored in the performance database on server 21. Apart from storing information regarding user progress and comparative success metrics, performance repository 14 also may store information about the phrases to be pronounced and the ASR results, which could be used to automatically build mispronunciation repository 13, and further to automatically generate suggestions on curriculum changes. Performance data analytics system 15 accordingly may generate curriculum changes 50, mispronunciation repository updates 51, identify reliable nodes 52 and/or the content of the node stars ("building stars 53").

Curriculum Changes

Performance repository 14 may be programmed to provide suggestions for changes in curriculum 11 via curriculum changes programming 50. Some of the ways in which such suggestions may arise include:

If a particular set of nodes is observed not to constitute a problem for speakers having a certain native language (e.g., the tracks are easily traversed with few failed attempts) while other nodes are observed to be more problematic for these speakers, then the tracks for those speakers may be modified to focus more on the problematic phrases.

If certain phrases require too many attempts to pass and have high failure rate, the ASR may be at fault. In this case, the nodes of the track may be modified (e.g., as in the "pitcher"—"picture" example above). If on the other hand the problematic phrase is just too complex, then it may be preferable to move the nodes in question to a higher level track; force the user to retrace lower level tracks to reinforce proper pronunciation mechanics with less complex phrases, or change the order of nodes in the track.

Mispronunciation Repository Updates

Analysis of the database in performance repository 14 may provide suggestions for updating the mispronunciation repository 51. Such updates may arise from the occurrence of the following situations:

If a particular phrase occurs regularly as an ASR result for a particular node for multiple users or for a particular language or gender but this phrase is not in the star for this node, then it can be added as an additional ray to that node star. In this way, feedback for this particular mispronunciation will be provided to the user if this mispronunciation has a higher score than other mispronunciations. As described in the preceding embodiment, if a particular phrase is in ASR results for a node but the node star does not have this phrase then no feedback is provided. Also, an additional ray in the node star will affect the scoring.

If a particular phrase from a node is consistently recognized by ASR as a different phrase while the correct phrase is on the second or lower rank in the list of ASR results (for example, if for the phrase "vest" the first ASR result is "best" while "vest" is ranked second), then the ray "vest"→"best" should be considered acceptable with no feedback provided to the user. This is an example of potentially insufficiently correct pronunciation of "vest" or may result for a weakness in the ASR on acoustic or language level, but in any event the results returned from the ASR are sufficiently ambiguous that no critique should be provided to the user in this instance. Alternatively, the node with the phrase "vest" could be excluded from the curriculum and substituted with another node with "v"-"b" minimal pair that is more reliably recognized in the cases of both correct and incorrect pronunciation.

Finding a Set of Reliable Curriculum Nodes

Still referring to FIG. 4, process 51 of determining the reliability of a node in the curriculum is defined by the ability of a user to consistently improve his or her pronunciation of the node's phrase and the ability of the present invention to provide correct feedback on mispronunciation. The reliability of a node can be determined by the structure and statistical distribution of its node star. The ideal node star is the star that consists of just one ray—such that all possible mispronunciations are reduced to a single error. Though, this is rarely expected to be the case unless the phrase for that node consists of a single phoneme. Accordingly, in the general case the goal is to find nodes that have a node star with relatively few rays that cover the majority of pronunciation errors. As will be understood and as discussed above, the number of rays emanating from a node star depends not only on the likely errors in user pronunciation but also on reliability and consistency of the ASR engine used. In addition, a node star may be reliable for one set of users, for example native speakers of a particular language, but not as reliable for native speakers of other languages. The following provides a non-exhaustive set of rules for building reliable node stars, which in turn may be used to support different curricula:

1. A set of phrases relevant to a particular theme (e.g. "travel") is chosen by extraction from the theme-related texts.

2. Native and non-native speakers are asked to pronounce each phrase multiple times.

3. The utterances are submitted to the ASR engine and the results are stored in the performance database.

4. For each phrase, the distributions of ASR results within a user, across different users, across different native languages, gender are calculated.

5. Phrases having a small number of strong peaks in distributions of ASR results are marked as candidates for curricula.

Building Stars for the Set of Reliable Curriculum Nodes

Still referring to FIG. 4, process 53 of building the star nodes as depicted in FIG. 2c is completed based on the identification of reliable center phrases, as described for process 52. In particular, for each node that was chosen as a candidate for a curriculum, a node star is built with rays leading to phrases that correspond to strong peaks in ASR results for the phrase in this node.

Candidate nodes selected for use in building a curriculum preferable have the following feature:

For each ray in its star, the distance between phonetic transcriptions of the phrase at the end of the ray and the phrase in the center of the star should be 1 or 2 and in some cases 3. If the distance is more than 3, it is unlikely that the ASR results will be sufficiently indicative of the phrase corresponding to the central node to be useful in detecting pronunciation errors for the center phrase.

For each ray and each substitution, omission of or addition into the phonetic transcription of the feedback text is supplied from a list of feedbacks built in advance for a corresponding mispronunciation.

Human-Machine Interface

Figure 5A:
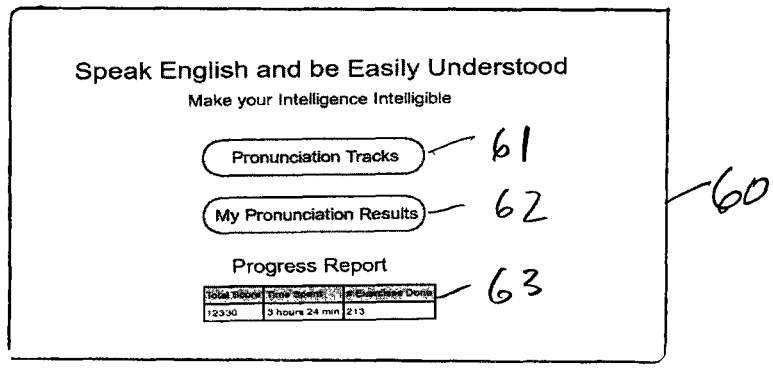
FIGS. 5a to 5j depict exemplary screenshots of a human-machine interface constructed in accordance with the present invention.
Figure 5B:
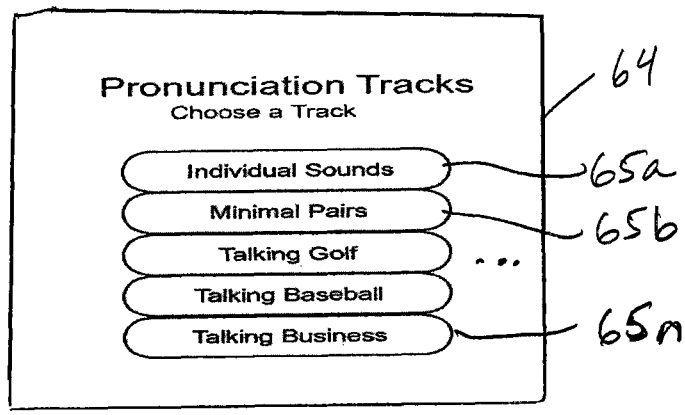
Figure 5C:
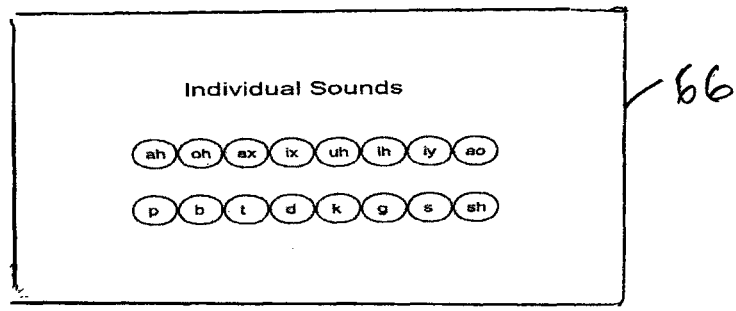
Figure 5D:
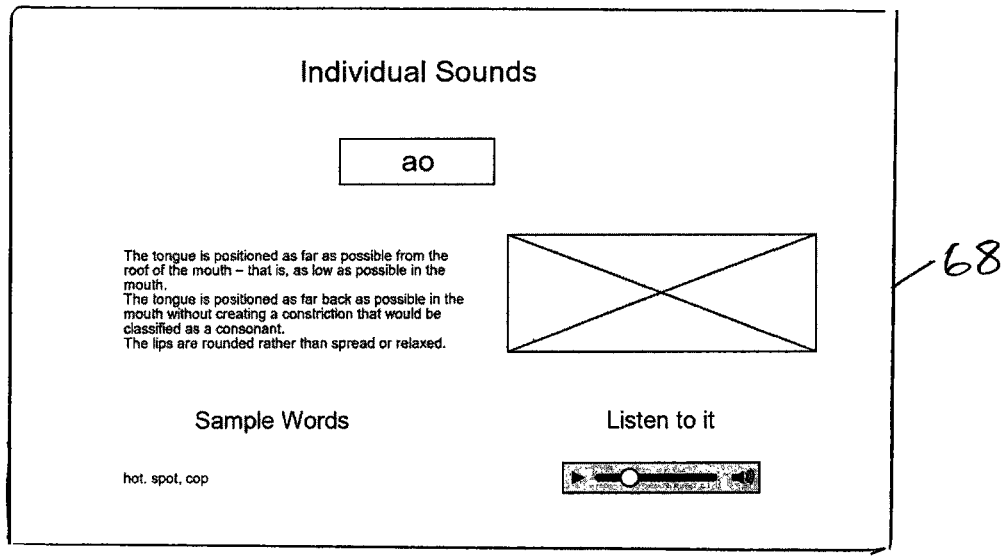
Figure 5E:
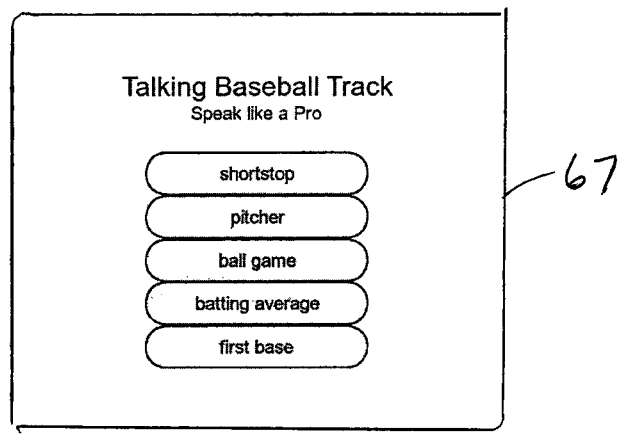
Figure 5F:
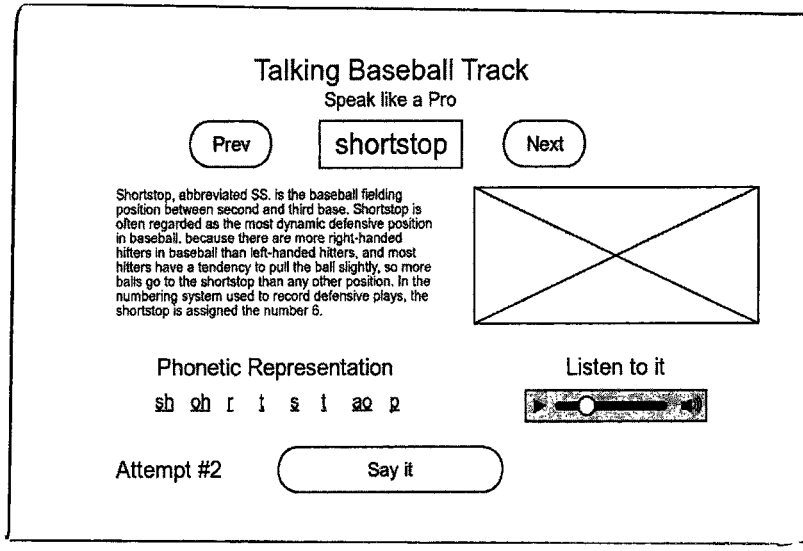
Figure 5G:
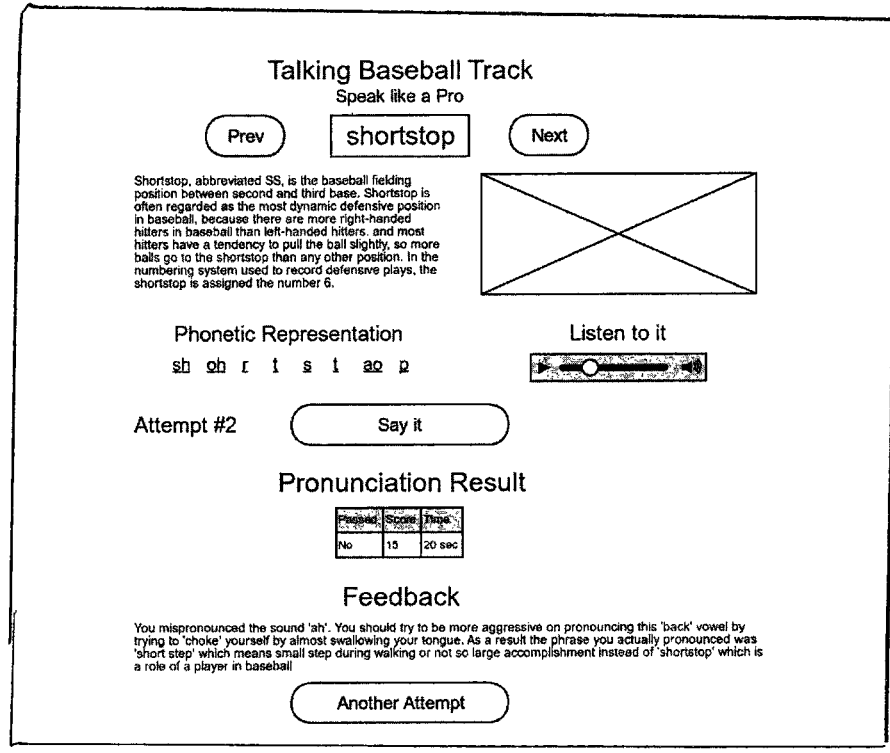
Figure 5H:
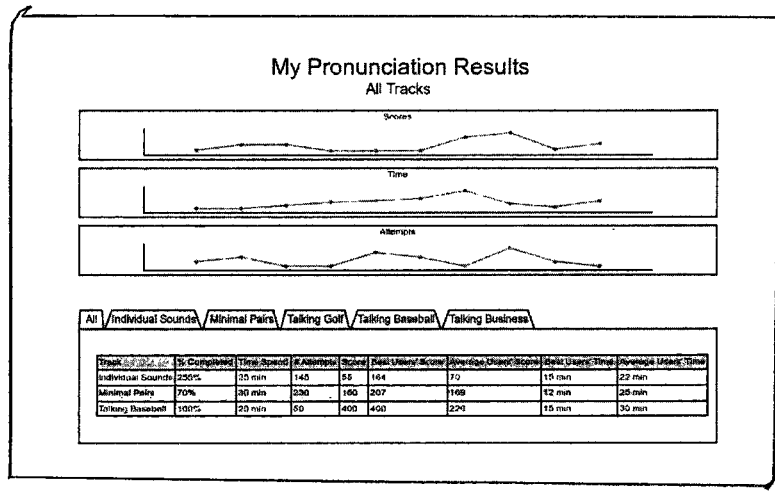
Figure 5I:
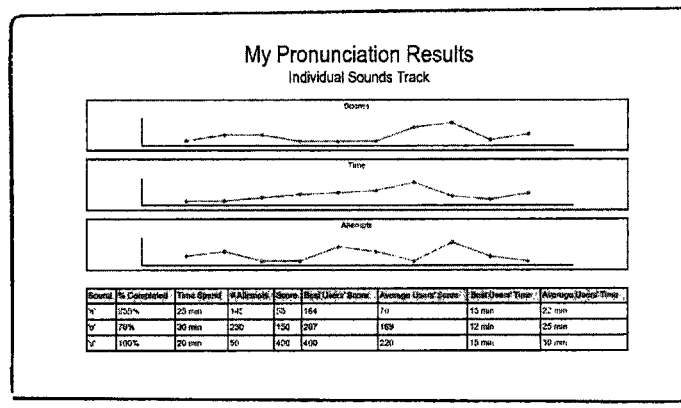
Figure 5J:
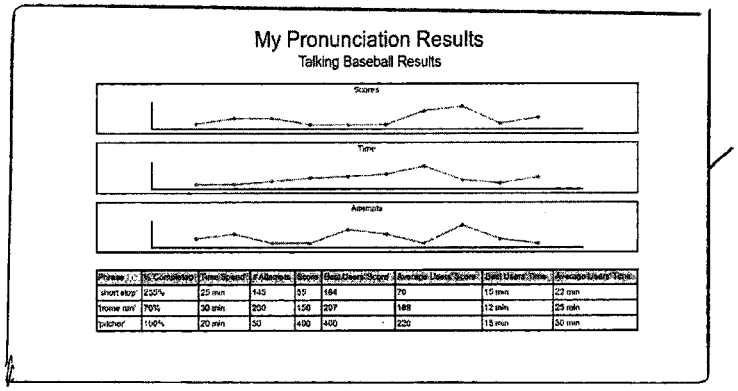

Referring now to FIGS. 5a to 5j, human-machine interface component 18 of the present invention includes a series of communication screens, depicted as illustrative screenshots:

a home page
a list of tracks page
individual track pages
a list of phonemes page
a phoneme page
a phrase page
a phrase recognized page
a track results page
a total results page Screenshots are depicted in FIG. 5a-5j for English language pronunciation training, but similar implementations may be done in other languages. FIG. 5a shows home page 60 that includes pronunciation tracks list 61, user pronunciation results 62 and curricula progress report 63. FIG. 5b shows a sample list of tracks page 64, which allows a user to choose which learning track 65a . . . 65n to study at a particular time. Exemplary track pages 66 and 67 are depicted in FIGS. 5c and 5e. FIG. 5d depicts exemplary phoneme page 68, which enables a user to learn how a particular sound should be pronounced. FIG. 5f depicts a sample phrase page 69, which enables a user to study the meaning of the phrase, its phonetic transcription and listen to how it is supposed to be pronounced. FIG. 5g is a sample phrase recognition page 70, which displays the results of user attempts to pronounce a phrase and feedback of the system with regard to pronunciation errors. FIGS. 5h, 5i and 5j depict, respectively, track results page 71 and total results page 72 and 73 for different curricula, which allow a user to see the progress he or she made in learning how to speak a foreign language correctly and areas where further improvement is needed.

While preferred illustrative embodiments of the invention are described above, it will be apparent to one skilled in the art that various changes and modifications may be made therein without departing from the invention. The appended claims are intended to cover all such changes and modifications that fall within the true spirit and scope of the invention.

What is claimed is:

1. A system for identifying a mispronounced phrase spoken by a user of a non-native language, comprising:
 a curriculum program module comprising a plurality of tracks, each track corresponding to a selected set phrases;
 a speech recognition system that analyzes an utterance spoken by the user, the utterance corresponding to a phrase of the track, the speech recognition system returning a ranked list of two or more recognized phrases;
 a pronunciation analysis module that:
  compares each of the ranked list of two or more recognized phrases to a series of mispronunciations corresponding to the selected phrase;
  matches one of the ranked list of two or more recognized phrases to a mispronunciation; and
  identifies guidance to correct the matched mispronunciation based upon the match of the one of the ranked list of two or more recognized phrases to a mispronunciation; and
 a human-machine interface that enables the user to select a curriculum, track a phrase, prompts the user to speak the utterance; and displays to the user the guidance identified by the pronunciation analysis module.

2. The system of claim 1, wherein the plurality of tracks are stored in a repository accessible via the Internet.

3. The system of claim 1, wherein the plurality of tracks are arranged by topic or theme.

4. The system of claim 1, further comprising a performance data analytics module that stores a first indication corresponding to the user's progress through a selected one of the plurality of tracks.

5. The system of claim 4, wherein the performance data analytics module stores a second indication corresponding to the user's progress through the plurality of tracks.

6. The system of claim 1, wherein the speech recognition system is accessible via the Internet.

7. The system of claim 6, wherein the speech recognition system comprises a publicly-available third-party speech recognition system.

8. The system of claim 1, wherein the series of mispronunciations corresponding to the selected phrase is logically arranged in a star configuration, comprising a central node corresponding to the selected phrase, and a ray corresponding to a mispronunciation of the selected phrase, wherein the phonetic transcription of the ray differs by no more than three elements from the phonetic transcription of the central node.

9. The system of claim 1, further comprising a mispronunciation repository accessible via the Internet, wherein the mispronunciation repository stores mispronunciations corresponding to phrases in the plurality of tracks.

10. The system of claim 1 wherein the human-machine interface is configured to operate on a mobile device.

11. A method for identifying a mispronounced word spoken by a user of a non-native language, comprising:
    presenting to the user a curriculum comprising a plurality of tracks, each track corresponding to a selected set of phrases;
    prompting the user to create an utterance corresponding to a phrase selected from among the plurality of tracks;
    analyzing, one or more electronic processors, the utterance using a speech recognition system, the speech recognition system returning a ranked list of two or more recognized phrases;
    comparing, the one or more electronic processors, each of the ranked list of two or more recognized phrases to a series of mispronunciations corresponding to the phrase;
    matching, using the one or more electronic processors, one of the ranked list of two or more recognized phrases to a mispronunciation;
    identifying, using the one or more electronic processors, guidance for the user to correct the matched mispronunciation based upon the match of the one of the ranked list of two or more recognized phrases to a mispronunciation; and
    displaying the guidance to the user.

12. The method of claim 11, further comprising arranging the plurality of tracks by topic or theme.

13. The method of claim 11, further comprising storing a first indication corresponding to the user's progress through a selected one of the plurality of tracks.

14. The method of claim 13, further comprising storing a second indication corresponding to the user's progress through the plurality of tracks.

15. The method of claim 11, further comprising accessing the speech recognition system via the Internet.

16. The method of claim 15, wherein accessing the speech recognition system via the Internet comprises accessing a publicly-available third-party speech recognition system.

17. The method of claim 11, further comprising logically arranging the series of mispronunciations corresponding to the phrase in a star configuration comprising a central node corresponding to the phrase, and a ray corresponding to a mispronunciation of the phrase, wherein the phonetic transcription of the ray differs by no more than three elements from the phonetic transcription of the central node.

18. The method of claim 11, further comprising storing mispronunciations corresponding to phrases in the plurality of tracks in a repository accessible via the Internet.

19. The system of claim 1, wherein the pronunciation analysis module further configured to filter one or more phrases from the ranked list of two or more recognized phrases based upon a confidence level threshold.

20. The system of claim 1, wherein the pronunciation analysis module further configured to determine that the first n matches of the ranked list of two or more recognized phrases do not match the phrase of the track, wherein n is greater than one, and wherein the matched one of the ranked list is the highest ranking phrases in the ranked list.

* * * * *

UNITED STATES PATENT AND TRADEMARK OFFICE
CERTIFICATE OF CORRECTION

PATENT NO. : 9,076,347 B2  Page 1 of 1
APPLICATION NO. : 13/828843
DATED : July 7, 2015
INVENTOR(S) : Julia Komissarchik and Edward Komissarchik It is certified that error appears in the above-identified patent and that said Letters Patent is hereby corrected as shown below:

In the claims

Column 11, line 33, Claim 11, insert --using-- after the word "analyzing,"

Column 11, line 37, Claim 11, insert --using-- after the word "comparing,"

Signed and Sealed this
Eighth Day of December, 2015

Michelle K. Lee
*Director of the United States Patent and Trademark Office*